(No Model.)

J. REYNOLDS.
SEED PLANTER.

No. 286,068. Patented Oct. 2, 1883.

Witnesses.
Louis F. Gardner
J W Garner

Inventor.
J. Reynolds
per
J. A. Lehmann, atty

UNITED STATES PATENT OFFICE.

JONATHAN REYNOLDS, OF SUMMIT, MISSISSIPPI.

SEED-PLANTER.

SPECIFICATION forming part of Letters Patent No. 286,068, dated October 2, 1883.

Application filed June 9, 1883. (No model.)

*To all whom it may concern:*

Be it known that I, J. REYNOLDS, of Summit, in the county of Pike and State of Mississippi, have invented certain new and useful Improvements in Planters; and I do hereby declare the following to be a full, clear, and exact description of the invention, such as will enable others skilled in the art to which it pertains to make and use it, reference being had to the accompanying drawings, which form part of this specification.

My invention relates to an improvement in seed-planters; and it consists in the combination of a rotating seed-disk that forms the bottom of a hopper, with a mechanism of peculiar construction for connecting the seed-disk with the driving-wheel that is journaled in the frame, thereby actuating the seed-disk, and in combining with said frame a coverer of peculiar construction that is adapted to cover the seeds when dropped.

It still further consists in the peculiar mechanism to be used when it is desired to plant seeds in hills, in substitution of the mechanism employed in actuating the disk when the planter is used for planting the seeds in drills, as will be more fully set forth hereinafter.

Figure 1:
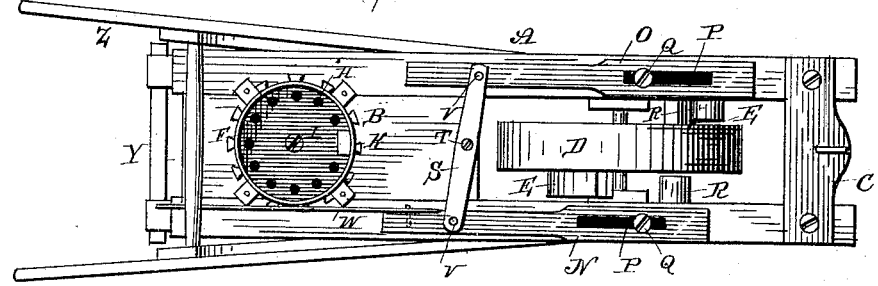
Figure 2:
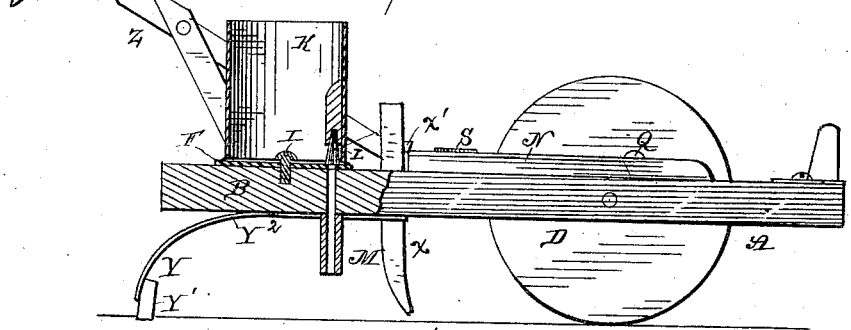
Figure 3:
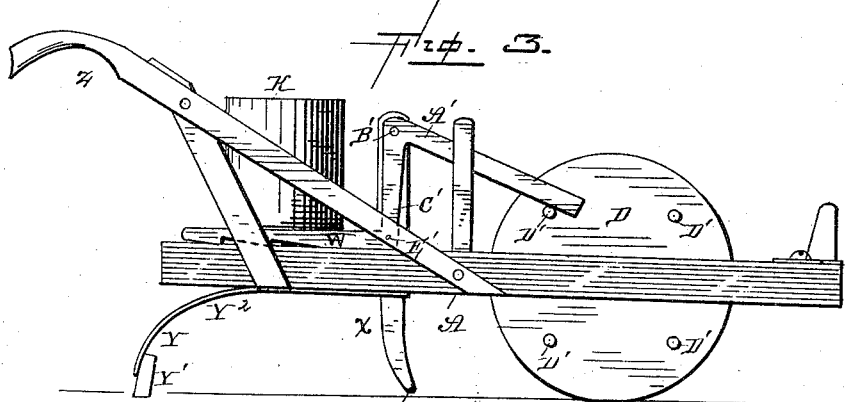
Figure 4:
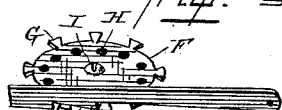

In the accompanying drawings, Figure 1 is a top plan view of my invention with the hill mechanism attached. Fig. 2 is a side elevation of the same, partly in section. Fig. 3 is a side elevation, showing the drill-planting mechanism in position. Fig. 4 is a detail plan view of the seed-disk and the rod or bar for actuating it.

A represents a frame having the platform B near its rear end, the cross-bar C at its forward end, and the driving-wheel D, journaled in suitable bearings between the side bars of the frame. This driving-wheel is provided with cams E, of the shape shown in Fig. 1, which cams are placed on opposite sides of the wheel and on the center thereof, as indicated.

F represents a seed-disk provided with a series of teeth or projections, G, upon its periphery, and a series of openings, H, at a suitable distance from the center. This seed-disk is pivoted to the platform by the pin I, and forms the bottom of the hopper K, which receives the seeds.

Secured to the front side of the hopper, on the inner side, is a brush, L, which registers with an opening formed in the platform, from the lower side of which opening projects the seed-spout M. The openings H in the seed-disk register successively with the seed-spout as the disk revolves.

N O represent bars, which are provided with slots P, through which slots pass the bolts Q, for securing the bars in position on the upper side of the side beams of the frame, and these bars have on their inner sides, near their forward ends, the friction-rollers R, which bear against the cams E of the wheel D as the wheel revolves. These bars are connected at their rear ends by the connecting-bar S, which is fulcrumed at T, the connecting-bar being connected to the reciprocating bars N O by the pins V, with which said bars are provided, and which extend through openings formed in the ends of the connecting-bar.

Pivoted to the rear end of the rod N, on the inner side thereof, is the bar W, which is provided with the tooth W', which tooth engages successively with the projections G on the seed-disk, and causes it to rotate as the bars N O reciprocate, which reciprocation is imparted to the bars N O by the cams E, as will be readily understood.

Secured in the platform B, at a suitable distance in advance of the seed-spout, is the furrow-opener X, which is adapted to be adjusted to any desired depth by means of the key X'.

Y represents a coverer, which is formed of the cross-beam Y' and the side springs, Y", which are curved, as shown in Figs. 2, 3, and are secured to the under side of the side bars of the frame at a suitable distance from the rear end thereof.

Z represents the handles, which are secured to the frame in the usual manner.

As heretofore described, this invention is adapted to be used only as a hill-planter; but when it is desired to use it for planting in drills I remove the connecting actuating mechanism previously described and substitute therefor the bent lever A', which is pivoted at B' to the standard C', that is secured in the platform, the outer end of this lever A' being operated by the tappet-pins D', which project from the side of the driving-wheel, the lower bent end of the lever being pivoted at E' to the pawl for actuating the seed-disk. As shown in Fig. 3, there are four of these tappet-pins placed upon the wheel, which would cause the seeds to be dropped four times to every revolution of the wheel, whereas when the hill-planting mechanism is attached the seeds will only be dropped once for every revolution of the wheel. It is obvious that any desired number of tappet-pins might be placed upon the wheel, and thus control the number of hills that are to be planted at each revolution thereof. The slotted standard E' is secured to the front end of the platform to keep the lever A' in position.

A seed-planter thus constructed is exceedingly light, cheap, simple, and easily constructed, is not liable to get out of order, and will perform its work thoroughly and well.

Having thus described my invention, I claim—

In a seed-planter, the combination of a rotating seed-disk, forming the bottom of the hopper, and provided with an opening or openings through which the seed can pass, a driving-wheel journaled in the frame, and provided with cams which are arranged on opposite sides of said wheel, reciprocating rods that are adapted to be actuated by the cams upon the driving-wheel, which rods are connected by a suitable connecting-lever, a pawl pivoted to the end of one of the reciprocating rods, and adapted to catch in the projections with which the seed disk is provided, causing the seed-disk to rotate as the bars reciprocate, a seed-spout for conveying the seeds from the seed-disk to the ground, a hopper for receiving the seeds, and a covering device, all combined and arranged substantially as shown.

In testimony whereof I affix my signature in presence of two witnesses.

JONATHAN REYNOLDS.

Witnesses:
  C. E. TEUNISSON,
  THOMAS ENOS.